United States Patent
Pfister (10) Patent No.: US 12,502,227 B2
(45) Date of Patent: Dec. 23, 2025

(54) METHOD AND SYSTEM FOR PROVIDING A CORRECTED DATASET

(71) Applicant: Siemens Healthcare GmbH, Erlangen (DE)

(72) Inventor: Marcus Pfister, Bubenreuth (DE)

(73) Assignee: Siemens Healthineers AG, Forchheim (DE)

( * ) Notice: Subject to any disclaimer, the term of this patent is extended or adjusted under 35 U.S.C. 154(b) by 714 days.

(21) Appl. No.: 17/740,330

(22) Filed: May 9, 2022

(65) Prior Publication Data

US 2022/0354588 A1 Nov. 10, 2022

(30) Foreign Application Priority Data

May 10, 2021 (DE) .................... 10 2021 204 728.9

(51) Int. Cl.
*A61B 34/20* (2016.01)
*A61B 34/30* (2016.01)
(Continued)

(52) U.S. Cl.
CPC .............. *A61B 34/20* (2016.02); *A61B 34/30* (2016.02); *A61B 90/361* (2016.02);
(Continued)

(58) Field of Classification Search
CPC ... A61B 34/20; A61B 34/30; A61B 2034/303; A61B 2034/301; A61B 6/504
See application file for complete search history.

(56) References Cited

U.S. PATENT DOCUMENTS

2007/0183569 A1* 8/2007 Boese ................ A61B 6/466
378/62
2009/0149867 A1* 6/2009 Glozman ............. A61B 34/70
600/407

(Continued)

FOREIGN PATENT DOCUMENTS

CN 110575235 A * 12/2019 ......... A61B 18/1815
CN 112102225 A 12/2020
(Continued)

OTHER PUBLICATIONS

Breininger, Katharina et al. "3D-Reconstruction of Stiff Wires from a Single Monoplane X-Ray Image", 2019, Bildverarbeitung für die Medizin, pp. 172-177.
(Continued)

*Primary Examiner* — Ted W Barnes
(74) *Attorney, Agent, or Firm* — Lempia Summerfield Katz LLC (57) ABSTRACT

A method for providing a corrected dataset includes receiving a preoperative dataset having an image and/or a model of an examination region in an examination subject. Intraoperatively, a first part of a medical object is arranged in the examination region and a second part of the medical object is arranged outside the examination subject. Positioning information relating to a spatial positioning of the second part of the medical object is received. An entry angle of the medical object into the examination subject is determined using the positioning information. An intraoperative dataset having an image of the examination region is received. A conversion instruction is determined based on the entry angle of the medical object to minimize a deviation between the preoperative and the intraoperative dataset, and the corrected dataset is generated by applying the conversion
(Continued)

instruction to the preoperative dataset. The corrected dataset is provided.

21 Claims, 7 Drawing Sheets (51) Int. Cl.
*A61B 90/00* (2016.01)
*A61B 34/10* (2016.01)
(52) U.S. Cl.
CPC ... *A61B 2034/102* (2016.02); *A61B 2034/105* (2016.02); *A61B 2034/2055* (2016.02); *A61B 2034/303* (2016.02)

(56) References Cited

U.S. PATENT DOCUMENTS

| | | | | |
|---|---|---|---|---|
| 2011/0235876 A1* | 9/2011 | Pfister | ................... | G16H 50/20 382/128 |
| 2013/0303893 A1* | 11/2013 | Duindam | ............. | A61B 5/0044 600/424 |
| 2015/0057526 A1* | 2/2015 | Gerken | ................. | A61B 6/037 600/407 |
| 2015/0094567 A1* | 4/2015 | Pfister | ................... | A61B 6/504 600/424 |
| 2015/0190204 A1* | 7/2015 | Popovi | ................... | A61B 5/061 600/424 |
| 2015/0342556 A1* | 12/2015 | Van Dijk | ............... | A61B 6/547 600/434 |
| 2017/0151027 A1* | 6/2017 | Walker | ................... | A61B 34/37 |
| 2017/0281145 A1 | 10/2017 | Crawford et al. | | |
| 2018/0279974 A1* | 10/2018 | Breininger | ............... | A61B 6/03 |
| 2020/0085281 A1* | 3/2020 | Regensburger | .. | A61B 1/000095 |
| 2020/0380705 A1 | 12/2020 | Breininger et al. | | |
| 2021/0030475 A1 | 2/2021 | Breininger et al. | | |
| 2021/0259780 A1* | 8/2021 | van Der Zaag | ........ | A61B 34/30 |
| 2022/0156925 A1* | 5/2022 | Bydlon | .......... | G06T 15/08 |
| 2022/0211452 A1* | 7/2022 | Clark | ....................... | G05G 1/01 |

FOREIGN PATENT DOCUMENTS

| | | | | |
|---|---|---|---|---|
| CN | 112309574 A | | 2/2021 | |
| EP | 4343707 A2 * | | 3/2024 | ............. G06T 19/20 |
| WO | WO-2019215056 A1 * | | 11/2019 | ......... A61B 10/0233 |

OTHER PUBLICATIONS

H. Mohammadi et al. "A Numerical Preoperative Planning Model to Predict Arterial Deformations in Endovascular Aortic Aneurysm Repair", Annals of Biomedical Engineering, 2018, https://doi.org/10.1007/s10439-018-2093-8; pp. 1-14.

* cited by examiner

METHOD AND SYSTEM FOR PROVIDING A CORRECTED DATASET

This application claims the benefit of German Patent Application No. DE 10 2021 204 728.9, filed on May 10, 2021, which is hereby incorporated by reference in its entirety.

BACKGROUND

The present embodiments relate to a method and system for providing a corrected dataset, and to a computer program product.

In the treatment and/or examination of changes in vessels of an examination subject, medical objects (e.g., a guide wire and/or a catheter) are often inserted into a vessel of the examination subject. For the image-based real-time monitoring of the medical object in the vessel, intraoperative X-ray projection images are often recorded using contrast agents (e.g., contrast agents containing iodine). Endovascular aortic repairs (EVARs), for example, are often carried out on angiography systems under fluoroscopic monitoring. By the registration and subsequent superimposition of a preoperatively recorded image dataset with one of the intraoperative X-ray projection images, it is often possible to achieve savings in the amount of contrast agent to be applied.

However, the disadvantage thereof is often that, due to the arrangement of the medical object in the vessel, a deformation or distortion of the vessel and/or of surrounding tissue may occur. The deformation is not shown in the preoperative image dataset. A deformation correction of the preoperative image dataset that is based only on the intraoperative X-ray projection images is often not sufficiently accurate (e.g., where no depth information is available).

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved intraoperative acquisition and/or imaging of an anatomical structure with a medical object arranged therein is facilitated.

In a first aspect, the present embodiments relate to a method for providing a corrected dataset. A preoperative dataset having an image and/or a model of an examination region in an examination subject is received. Intraoperatively, a first part of a medical object is arranged in the examination region. Intraoperatively, a second part of the medical object is further arranged outside the examination subject. Further, positioning information relating to a spatial positioning of the second part of the medical object is received. In addition, an entry angle of the medical object into the examination subject is determined using the positioning information. Further, an intraoperative dataset having an image of the examination region is received. A conversion instruction based on the entry angle of the medical object is subsequently determined to minimize a deviation between the preoperative and the intraoperative dataset. Further, the corrected dataset is generated and subsequently provided by applying the conversion instruction to the preoperative dataset.

The acts described in the aforementioned may be carried out successively and/or at least sometimes simultaneously. Further, the acts described in the aforementioned may be carried out repeatedly when there is a change in the spatial positioning of the first part and/or the second part of the medical object (e.g., when there is a change in the entry angle).

The examination subject may be a human patient, for example, and/or an animal patient and/or an examination phantom (e.g., a vascular phantom). Further, the examination region may describe a spatial section of the examination subject that may include, for example, an anatomical structure of the examination subject (e.g., a hollow organ). The hollow organ may be embodied, for example, as a section of a vessel (e.g., an artery and/or a vein) and/or a vascular tree and/or a heart and/or a lung and/or a liver.

The medical subject may be embodied, for example, as a surgical and/or diagnostic instrument (e.g., elongated). For example, the medical object may be flexible and/or rigid at least in sections. The medical subject may be embodied, for example, as a catheter and/or an endoscope and/or a guide wire. In one embodiment, the medical object may be at least partly introduced intraoperatively into the examination subject (e.g., into the examination region, via an introducer sheath). For example, the first part of the medical object may be arranged in the examination region before the start of the method. Here, the first part of the medical object may refer to a first section of the medical object (e.g., to a first longitudinal section along a longitudinal extension direction of the medical object). The first section is arranged intraoperatively in the examination region. Further, the second part of the medical object may refer to a second section of the medical object (e.g., to a second longitudinal section along the longitudinal extension direction of the medical object). The second section is arranged intraoperatively outside the examination subject. The entry point of the medical object into the examination subject (e.g., into the examination region) may denote a boundary (e.g., a variable boundary) between the first part and the second part of the medical object.

Receiving the preoperative dataset and/or the positioning information and/or the intraoperative dataset may include, for example, the acquisition and/or readout of a computer-readable data memory and/or the receiving thereof from a data memory unit (e.g., from a databank).

The preoperative and/or the intraoperative dataset, for example, may be recorded and/or provided by one or various medical imaging devices. The medical imaging device for recording the preoperative and/or the intraoperative dataset may be embodied, for example, as a computer tomography (CT) facility and/or magnetic resonance (MRT) facility and/or medical X-ray device and/or ultrasound device and/or positron emission tomography (PET) facility.

In one embodiment, the preoperative dataset may have a two-dimensional (2D) and/or three-dimensional (3D) image of the examination region (e.g., a time-resolved image of the hollow organ). The preoperative dataset may represent the examination region preoperatively (e.g., introduced into the examination region and/or arranged therein at a time before the medical object). For example, the preoperative dataset may have a contrasted and/or segmented image of the examination region (e.g., of the hollow organ).

Alternatively or additionally, the preoperative dataset may have a 2D and/or 3D model (e.g., a central line model and/or a volume model; a volume mesh model) of the examination region (e.g., of the hollow organ).

The preoperative dataset may be registered with a coordinate system of the examination subject and/or of the medical imaging device and/or of a patient-positioning apparatus. The examination subject may be arranged preoperatively and/or intraoperatively on the patient-positioning apparatus. In one embodiment, the preoperative dataset may have an image and/or a model of a spatial course of the hollow organ in the examination region. Further, the preoperative dataset may have metadata. The metadata may include, for example, information relating to a recording parameter and/or operating parameter of the medical imaging device for recording the preoperative dataset.

The positioning information may include information relating to the spatial positioning (e.g., current spatial positioning; to a spatial position and/or orientation and/or pose) of the second part of the medical object. The positioning information may, for example, be received by an acquisition unit for the acquisition of the spatial positioning (e.g., current spatial positioning) of the second part of the medical object. The acquisition unit may be arranged, for example, on the medical object (e.g., on the second part of the medical object) and/or at least partly incorporated therein. Alternatively or additionally, the acquisition unit may be arranged apart from the medical object. For example, the acquisition unit may be arranged on the introducer sheath and/or on the medical imaging device to record the preoperative and/or intraoperative dataset. The acquisition unit may have a sensor (e.g., an optical and/or electromagnetic and/or acoustic and/or mechanical and/or gyroscopic sensor) that is embodied for the acquisition of the spatial positioning of the second part of the medical object.

Further, the positioning information may be received by a positioning unit for positioning of the medical object. In one embodiment, the positioning unit may be embodied for specifying the spatial positioning of the second part of the medical object.

In one embodiment, the positioning information may be registered with the preoperative and/or with the intraoperative dataset. In one embodiment, the positioning information may describe the spatial positioning (e.g., the spatial position and/or orientation and/or pose) of the second part of the medical object in the coordinate system of the examination subject and/or of the medical imaging device for recording the preoperative and/or intraoperative dataset and/or the patient-positioning apparatus. The positioning information may have, for example, an intraoperative image and/or an orientation parameter that describes the spatial positioning (e.g., current spatial positioning) of the second part of the medical object. In one embodiment, the positioning information may describe the spatial positioning of the second part of the medical object (e.g., of a longitudinal extension direction of the second part of the medical object) in relation to the examination subject (e.g., at the entry point in relation to a surface of the examination subject and/or to a reference direction). In one embodiment, the reference direction may run through the entry point in a plane tangential to the surface of the examination subject. Further, the entry angle of the medical object into the examination subject may be determined (e.g., at the entry point) in relation to the surface of the examination subject and/or the reference direction using the positioning information. The entry angle may describe, for example, an angle between the longitudinal extension direction of the second part of the medical object and the surface of the examination subject and/or the reference direction. Alternatively, at least in sections, the reference direction may run parallel to a central line of the hollow organ at the entry point of the medical object into the examination subject.

The intraoperative dataset may have a 2D- and/or 3D-image (e.g., a time-resolved image) of the examination region (e.g., of the hollow organ) and of the first part of the medical object that is arranged therein. The intraoperative dataset may represent the examination region intraoperatively (e.g., while the first part of the medical object is arranged in the examination region). The intraoperative dataset may be registered with a coordinate system of the examination subject and/or of the medical imaging device for recording the preoperative and/or intraoperative dataset and/or the patient-positioning apparatus. Further, the intraoperative dataset and the preoperative dataset may be registered.

The conversion instruction may have information regarding a rigid and/or non-rigid and/or global and/or local and/or regional conversion of the preoperative dataset (e.g., a translation and/or rotation and/or deformation and/or scaling). In one embodiment, the acquisition of the conversion instruction may include an optimization (e.g., a cost-minimizing optimization). The deviation between the preoperative dataset (e.g., a preoperatively represented and/or modelled spatial course of an anatomical structure, such as of the hollow organ) in the examination region and the intraoperative dataset (e.g., the intraoperatively represented spatial course of the first part of the medical object) is minimized by applying the conversion instruction to the preoperative dataset. The deformation of the anatomical structure in the examination region (e.g., of the hollow organ) that may be caused by the first part of the medical object that, intraoperatively, is arranged therein may be determined (e.g., modelled) using the entry angle (e.g., current entry angle) of the medical object into the examination subject. In one embodiment, a spatial positioning (e.g., a current spatial positioning; the spatial course) of the first part of the medical object may be determined using the intraoperative dataset and the entry angle.

The generation of the corrected dataset may include applying to the preoperative dataset the conversion instruction that has been determined (e.g., latest conversion instruction). In one embodiment, the corrected dataset may be provided. Further, providing the corrected dataset may include, for example, storage on a computer-readable storage medium and/or display on the display unit and/or transmission to a processing unit. For example, a graphic representation of the corrected dataset may be displayed on a display unit.

The embodiment may facilitate an improved (e.g., precise and/or X-ray dose-efficient) deformation correction of the preoperative dataset. The positioning information may be used as extracorporeal information for determining the conversion instruction. Through the corrected dataset provided, a user (e.g., a medical operator) may be supported (e.g., in an EVAR procedure and/or in a transapical aortic valve replacement).

Although the method provided here describes the provision of a corrected dataset for a medical object that is at least partly arranged in the examination region, the method may also be applied, according to the present embodiments, to the provision of a corrected dataset for a plurality of medical objects (e.g., identical or different) that are at least partly arranged in the examination region (e.g., simultaneously).

In a further embodiment of the method, the intraoperative dataset may have a 2D-image of the examination region. The determination of the conversion instruction may include a determination of a spatial course of the first part of the medical object based on the 2D image of the examination region and the entry angle.

In one embodiment, the intraoperative dataset may represent two-dimensionally the examination region and the first part of the medical object that is arranged therein (e.g., as a projection image, such as an X-ray projection image)

along a projection direction (e.g., an angulation). As a result thereof, the first part of the medical object in an image plane of the intraoperative dataset may be acquired two-dimensionally. In one embodiment, by additionally considering the entry angle of the medical object into the examination subject, the spatial course of the first part of the medical object may be determined three-dimensionally. For example, depth information relating to the 2D-image of the first part of the medical object may be determined using the entry angle.

Further, the preoperative dataset (e.g., the image and/or the model of the examination region) may have preoperative information relating to a spatial course and/or to a spatial extension (e.g., to a diameter and/or cross-section of the hollow organ, such as along the longitudinal extension direction thereof; along a central line). In one embodiment, the preoperative information may be considered as a boundary condition in the determination of the spatial course of the first part of the medical object.

As a result thereof, a time-efficient and at the same time precise deformation correction of the preoperative dataset may be facilitated.

In a further embodiment of the method, the positioning information may have an intraoperative image of the second part of the medical object. Further, the intraoperative image may be registered with the preoperative dataset and/or with the intraoperative dataset.

In one embodiment, the positioning information (e.g., the intraoperative image) may be recorded by an acquisition unit. The acquisition unit may have, for example, an optical and/or electromagnetic and/or acoustic sensor that is embodied to record and/or provide the intraoperative image of the second part of the medical object.

Insofar as the intraoperative image represents the second part of the medical object two-dimensionally in a spatially resolved form, the intraoperative image may also represent a reference object (e.g., a marker structure). The reference object is arranged on the second part of the medical object. As a result thereof, the spatial positioning of the second part of the medical object may be determined using the two-dimensionally spatially resolved intraoperative image.

In one embodiment, the intraoperative image may be registered with the preoperative dataset and/or with the intraoperative dataset. For example, the intraoperative image may be registered with the coordinate system of the examination subject and/or of the medical imaging device for recording the preoperative dataset and/or the intraoperative dataset and/or of the patient-positioning apparatus.

The determination of the entry angle using the positioning information (e.g., using the intraoperative image) may include an identification (e.g., a segmentation) of the second part of the medical object in the intraoperative image. In one embodiment, image points in the intraoperative image may be identified by image values (e.g., intensity values) that represent the second part of the medical object. Hereafter, the entry angle of the medical object into the examination subject may be determined by the registration between the intraoperative image and the preoperative dataset and/or between the intraoperative image and the intraoperative dataset.

Through an extracorporeal acquisition of the second part of the medical object by the acquisition unit, a precise and patient-friendly (e.g., X-ray dose-efficient) provision of the positioning information may be facilitated.

In a further embodiment of the method, the intraoperative image may be recorded by a camera unit.

The camera unit may have one or a plurality of cameras that are embodied to record and provide the intraoperative image. In one embodiment, the camera unit may be embodied to acquire at least one part of the examination subject (e.g., a surface of the examination subject at the entry point of the medical object), and to acquire the second part of the medical object. Insofar as the camera unit has at least two cameras, the at least two cameras may have a defined arrangement (e.g., being spaced apart from each other). As a result thereof, a three-dimensionally spatially resolved intraoperative image of the second part of the medical object may be facilitated by the camera unit. The one camera or the plurality of cameras in the camera unit may each be embodied as a monocamera and/or depth camera and/or stereo camera and/or 3D camera.

As a result thereof, a precise intraoperative image (e.g., three-dimensional intraoperative image) of the second part of the medical object may be facilitated. In addition, the camera unit may be embodied to acquire, at the entry point of the medical object, at least one section of the surface of the examination subject and/or a reference object. As a result thereof, the spatial positioning of the second part of the medical object in relation to the surface of the examination subject may be represented intraoperatively at the entry point by the camera unit.

In a further embodiment of the method, a material parameter and/or an operating parameter of the medical object may be received. In addition, the conversion instruction may additionally be determined based on the material parameter and/or on the operating parameter.

The material parameter may have information relating to plasticity (e.g., to the deformability and/or stiffness and/or extensibility and/or torsional strength and/or pliability and/or elasticity) of the medical object. Further, the operating parameter may describe information relating to an operational state (e.g., a current operational state) of the medical object. For example, the operating parameter may include information relating to a spatial pose of the medical object (e.g., of the pre-defined section).

In one embodiment, the conversion instruction may also be determined based on the material parameter and/or on the operating parameter as a boundary condition. For example, the determination of the conversion instruction may be based on a deformation model of the medical object. The deformation model of the medical object may have information (e.g., a physical boundary condition) relating, for example, to the sectional, deformability and/or stiffness and/or elasticity and/or torsional strength of the medical object (e.g., of the first part of the medical object). In one embodiment, the deformation model may be spatially resolved at least along the longitudinal extension direction of the medical object (e.g., three-dimensionally). Further, the deformation model may be adjusted using the material parameter and/or the operating parameter.

The embodiment may facilitate an improved determination of the conversion instruction while considering the physical properties of the medical object.

In a further embodiment of the method, the medical object may be arranged in a positioning unit. In one embodiment, the positioning unit may be embodied to accommodate the medical object such that: a spatial positioning at least of the second part of the medical object may be specified; and the medical object is movable along a longitudinal extension direction of the medical object and/or around the longitudinal extension direction. In addition, the positioning information may be provided by the positioning unit.

The positioning unit may have an introducer sheath for introducing the medical object into the examination subject and/or a moving apparatus to robotically move the medical object, which are explained in the further course of the description.

In one embodiment, the positioning unit may be embodied to accommodate at least one part (e.g., the second part) of the medical object. The positioning unit may be embodied to specify a spatial positioning (e.g., a spatial position and/or orientation and/or pose) at least of the second part of the medical object. For example, the positioning unit may be embodied to specify the entry angle of the medical object into the examination subject by setting the spatial positioning at least of the second part of the medical object. Further, the positioning unit may be embodied to accommodate (e.g., to guide and/or hold and/or move) the medical object such that the medical object is movable along the longitudinal extension direction and/or around the longitudinal extension direction. As a result thereof, a movability of the medical object in relation to the longitudinal extension direction thereof is facilitated while retaining the entry angle specified by the positioning unit.

In one embodiment, the positioning information may be provided by the positioning unit (e.g., by the introducer sheath and/or moving apparatus). The provision of the positioning information may include, for example, storage on a computer-readable storage medium and/or display on a display unit and/or transfer to the processing unit.

In a second aspect, the present embodiments relate to a system for providing a corrected dataset. The system has a medical imaging device and a processing unit. In addition, the system has an acquisition unit and/or a positioning unit. Further, the processing unit is embodied to receive a preoperative dataset having an image and/or a model of an examination region in an examination subject. In an operational state of the system, a first part of a medical object is arranged in the examination region. Further, in the operational state of the system, a second part of the medical object is arranged outside the examination subject. In addition, the acquisition unit and/or the positioning unit are embodied to provide positioning information relating to a spatial positioning of the second part of the medical object. Further, the medical imaging device is embodied to record an intraoperative dataset. In one embodiment, the intraoperative dataset represents the examination region in the operational state of the system. Further, the processing unit is embodied to determine an entry angle of the medical object into the examination subject using the positioning information. In addition, the processing unit is embodied to determine a conversion instruction to minimize a deviation between the preoperative dataset and the intraoperative dataset, based on the entry angle of the medical object. Further, the processing unit is embodied to provide the corrected dataset by applying the conversion instruction to the preoperative dataset.

The advantages of the system essentially correspond to the advantages of the method for providing a corrected dataset. Features, advantages, or alternative embodiments referred to here may equally well be applied to other claimed subject matter and vice versa.

In a further embodiment of the system, the acquisition unit may have a camera unit. The camera unit may be embodied to record the positioning information having an intraoperative image of the second part of the medical object. Further, the intraoperative image may be registered with the preoperative and/or with the intraoperative dataset.

In a further embodiment of the system, the camera unit may be arranged in a defined arrangement on the medical imaging device and/or be at least partly incorporated in the medical imaging device.

The defined arrangement may describe a spatial correspondence between the camera unit (e.g., an acquisition region and/or a direction of view of the camera unit) and the medical imaging device (e.g., an acquisition region and/or an image geometry of the medical imaging device). In one embodiment, the camera unit may be arranged on the medical imaging device (e.g., tiltably and/or rotatably and/or pivotably), such that the second part of the medical object and the entry point of the medical object into the examination subject may be acquired by the camera unit. Alternatively or additionally, the camera unit may be at least partly (e.g., entirely) incorporated in the medical imaging device (e.g., inside a housing of the medical imaging device).

As a result thereof, an inherent registration between the camera unit and the medical imaging device (e.g., an inherent registration between the intraoperative image with the preoperative dataset and/or with the intraoperative dataset) may be facilitated.

In a further embodiment of the system, the positioning unit may be embodied to accommodate the medical object such that: the spatial positioning of at least the second part of the medical object may be specified; and the medical object is movable along the longitudinal extension direction and/or around the longitudinal extension direction. In addition, the positioning unit may be embodied to provide the positioning information.

In a further embodiment of the system, the positioning unit may have an introducer sheath for introducing the medical object into the examination subject. In one embodiment, the introducer sheath may have an instrument channel and a holding element. Further, the holding element may be embodied to hold the instrument channel at an entry point of the medical object into the examination subject (e.g., to detachably affix the instrument channel). In addition, the instrument channel may have a first aperture and a second aperture. The instrument channel may be embodied to accommodate at least one part of the medical object and to specify the entry angle of the medical object. Further, in the operational state of the system, the first aperture may be arranged extracorporeally on the examination subject. In addition, in the operational state of the system, the second aperture may be arranged on a lumen of a hollow organ in the examination subject. Further, in the operational state of the system, the medical object may be introduced along the instrument channel into the hollow organ via the first aperture and the second aperture.

The instrument channel may have a tube-shaped and/or tunnel-shaped recess that connects the first aperture with the second aperture. In one embodiment, the recess may essentially run in a straight line. The first aperture and the second aperture in the instrument channel, and also the recess that runs between the first aperture and the second aperture may be embodied for accommodating the at least one part of the medical object (e.g., for accommodating the second part of the medical object). For example, in the operational state of the system, the medical object may be arranged via the first aperture and the second aperture along the instrument channel (e.g., inside the recess).

In one embodiment, the instrument channel may be embodied such that the instrument channel (e.g., the recess) does not become deformed and/or move when force is exerted by the medical object (e.g., perpendicular to the longitudinal extension direction thereof). As a result thereof, the instrument channel may be embodied to guide the medical object along the recess (e.g., in a straight line) into the hollow organ of the examination subject via the second aperture.

The holding element may be embodied to mount the instrument channel onto the entry point (e.g., on a surface of the examination subject, to detachably affix the instrument channel). The holding element may be fixable, for example, by a fixing device (e.g., an adhesive) on the surface of the patient. In one embodiment, the holding element may further be embodied to hold the instrument channel at the entry point in such a stable manner that a spatial orientation of the instrument channel (e.g., of the recess) remains unchanged and/or adjustable in relation to the entry point. The instrument channel may be mounted in relation to the holding element such that, in the operational state of the system, the instrument channel is arranged in a fixed manner in relation to the holding element, and in a further operational state of the system, is tiltable and/or pivotable in relation to the holding element (e.g., to the entry point). The introducer sheath may have a further sensor (e.g., an optical and/or electromagnetic and/or acoustic and/or mechanical and/or gyroscopic sensor) that is embodied for acquiring the spatial orientation of the instrument channel (e.g., a longitudinal extension direction of the instrument channel) in relation to the holding element (e.g., in relation to the entry point). As a result thereof, the instrument channel may be embodied to specify the entry angle of the medical object (e.g., in a flexible manner).

Further, in the operational state of the system, the first aperture may be arranged extracorporeally (e.g., turned away from the examination subject). In addition, in the operational state of the system, the second aperture may be arranged on the hollow organ of the examination subject (e.g., endoluminally). Further, in the operational state, the medical object may be introduced into the hollow organ via the first aperture and the second aperture along the instrument channel (e.g., inside the recess).

The introducer sheath may be embodied to provide the positioning information. In one embodiment, the provision of the positioning information using the introducer sheath may include, for example, storage on a computer-readable storage medium and/or display on a display unit and/or transmission to the processing unit. For example, the introducer sheath may be embodied to provide the positioning information using the spatial orientation of the instrument channel in relation to the holding element that has been acquired by the further sensor. Alternatively or additionally, the provision of the positioning information may include provision of an identification parameter relating to the introducer sheath. The processing unit is embodied to determine the positioning information (e.g., the entry angle) using the identification parameter (e.g., using a databank). The databank may have a plurality of introducer sheaths with respective geometrical parameters (e.g., with the respective entry angle).

Using the embodiment (e.g., using the introducer sheath), the entry angle of the medical object into the examination subject may be specified, and the deformation correction of the preoperative dataset may be carried out precisely (e.g., without an intraoperative image of the second part of the medical object). In one embodiment, the processing unit may be embodied to determine the conversion instruction on one occasion, based on the spatial positioning, specified by the introducer sheath, at least of the second part of the medical object (e.g., based on the entry angle of the medical object). As a result thereof, a particularly computation-efficient deformation correction of the preoperative dataset may be facilitated.

In a further embodiment of the system, the positioning unit may have a moving apparatus for the robotic moving of the medical object. Further, in the operational state of the system, the second part of the medical object may be at least partly arranged in the moving apparatus.

In one embodiment, the moving apparatus may be a robotic apparatus that is embodied for the remote manipulation of the medical object (e.g., a catheter robot). In one embodiment, the moving apparatus is arranged outside the examination subject. Further, the moving apparatus may have a fixing element (e.g., a movable and/or traversable fixing element). In addition, the moving apparatus may have a cassette element that is embodied for accommodating the second part of the medical object. Further, the moving apparatus may have a moving element that is mounted on the fixing element (e.g., on a stand and/or a robotic arm). In addition, the fixing element may be embodied for fixing the moving element onto the patient-positioning apparatus. Further, the moving element may have at least one actuator element (e.g., an electric motor) that may be controlled by the processing unit. In one embodiment, the cassette element may be connectable (e.g., mechanically and/or electromagnetically and/or pneumatically) to the moving element (e.g., to the at least one actuator element). Further, the cassette element may have at least one transmission element that is movable due to the connection between the cassette element and the moving element (e.g., the at least one actuator element). For example, the at least one transmission element may be movably connected to the at least one actuator element. In one embodiment, the transmission element is embodied to transmit a movement of the actuator element to the medical object such that the medical object is moved along a longitudinal extension direction of the medical object and/or that the medical object is rotated around the longitudinal extension direction of the medical object. The at least one transmission element may have, for example, a pulley and/or roller and/or faceplate and/or shear plate. Further, the transmission element may be embodied to hold the medical object by transmitting a force (e.g., in a stable manner). The holding of the medical object may include positioning at least the medical object, for example, in relation to the moving apparatus. Further, in the operational state of the system, the moving apparatus may be embodied to specify the spatial positioning of the second part of the medical object that is at least partly arranged in the moving apparatus (e.g., in relation to the examination subject, such as by a corresponding positioning and/or pose of the fixing element).

In one embodiment, the moving element may have a plurality of, for example, independently controllable actuator elements. Further, the cassette element may have a plurality of transmission elements (e.g., at least one movement-connected transmission element for each of the actuator elements). As a result thereof, a movement (e.g., an independent and/or simultaneous movement of the medical object along various degrees of freedom) may be facilitated.

Further, the moving apparatus may include a sensor unit (e.g., an electromagnetic and/or optical and/or acoustic and/or mechanical and/or gyroscopic sensor) that is embodied to acquire a spatial positioning of the second part of the medical object. Alternatively or additionally, the sensor unit may be embodied to acquire a spatial positioning of the cassette element and/or of the fixing element. The second part of the medical object accommodated in the moving apparatus has a defined relative positioning in relation to the cassette element and/or the fixing element. As a result thereof, the spatial positioning of the second part of the medical object may likewise be acquired.

In one embodiment, the sensor unit may be embodied to provide to the processing unit the positioning information having information relating to the spatial positioning that has been acquired of the second part of the medical object.

The embodiment may facilitate a flexible specification and precise acquisition of the spatial positioning of the second part of the medical object in relation to the entry point into the examination subject. As a result thereof, an improved deformation correction of the preoperative dataset may be facilitated.

In a further embodiment of the system, the processing unit may be embodied to receive a specification relating to the entry angle. Further, the processing unit may be embodied to identify a deviation by making a comparison between the entry angle that has been determined and the specification. In addition, the processing unit may be embodied to provide a signal and/or a workflow notification as a function of the deviation.

The specification relating to the entry angle may be provided, for example, by an input from a user using an input unit and/or a treatment plan. In one embodiment, the specification relating to the entry angle may have a target value for the entry angle. In addition, the specification may have a maximum deviation of the entry angle in relation to the ideal value.

In one embodiment, the processing unit may further be embodied to compare the entry angle (e.g., current entry angle) with the specification (e.g., with the ideal value). The comparison may include, for example, a determination of a difference and/or of a quotient between the entry angle and the specification (e.g., with the ideal value). In one embodiment, the processing unit may be further embodied for identifying a deviation between the entry angle and the specification using the comparison (e.g., qualitatively or quantitatively). In one embodiment, the processing unit may be further embodied to provide the signal and/or the workflow notification as a function of the deviation that has been identified. The signal and/or the workflow-notification may include qualitative and/or quantitative information relating to the deviation that has been identified. The processing unit may be embodied to identify the deviation repeatedly (e.g., to compare the entry angle repeatedly with the specification) and to provide the signal and/or the workflow-notification as a function of the respective last-identified deviation. The provision of the signal and/or of the workflow-notification may include storage on a computer-readable storage medium and/or outputting by an output unit (e.g., a display unit and/or a loudspeaker) and/or transmission to a processing unit.

The signal may be, for example, an acoustic and/or haptic and/or optical signal that may be output by the output unit. In one embodiment, the signal may be provided such that the signal may be acquired by a user who is controlling the medical object and/or the positioning unit (e.g., the introducer sheath and/or the moving apparatus) visually and/or haptically and/or acoustically. While the signal may be embodied, for example, for qualitative information about the deviation identified, the workflow-notification may include information (e.g., an instruction) to reduce the deviation identified. For example, the workflow-notification may include information as to along which spatial direction the second part of the medical object is to move in order to minimize the deviation identified. In one embodiment, the workflow-notification may be output by the output unit.

First, as a result thereof, when there is too great a deviation between the entry angle and the specification, the risk of an injury to the examination subject (e.g., to the hollow organ) may be reduced. Further, by the specification, an ideal value and/or value range for the entry angle for which the deformation correction of the preoperative dataset is determinable may be specified.

A third aspect of the present embodiments relates to a computer program product with a computer program that may be loaded directly into a memory of a processing unit, with program segments to carry out all the acts in the method of one or more of the present embodiments for providing a corrected dataset, when the program segments are carried out by the processing unit. The computer program product may include software with a source code that still is to be compiled and bound or merely interpreted, or may include an executable software code that only is to be loaded into the processing unit for execution. Using the computer program product, it is possible to carry out the method for providing a corrected dataset in a fast, identically reproducible, and robust manner by a processing unit. The computer program product is configured such that the computer program product may carry out the process acts according to the present embodiments by the processing unit.

The advantages of the computer program product essentially correspond with the advantages of the method for providing a corrected dataset. Features, advantages, or alternative embodiments referred to here may equally well also be applied to the other subject matter and vice versa.

The computer program product is stored, for example, on a computer-readable storage medium (e.g., a non-transitory computer-readable storage medium) or on a network or server from which the computer program may be loaded into the processor of a processing unit. The processor is directly connected to the processing unit or may be embodied as part of the processing unit. Further, control data from the computer program product may be stored on an electronically readable data carrier. The control data from the electronically readable data carrier may be embodied such that the control data carries out a method according to the present embodiments when the data carrier is used in a processing unit. Examples of electronically readable data carriers are a DVD, a magnetic tape, or a USB stick, on which electronically readable control data (e.g., software) is stored. When this control data is read by the data carrier and stored in a processing unit, all the embodiments of the methods described in the aforementioned may be carried out.

The present embodiments also include a computer-readable storage medium (e.g., a non-transitory computer-readable storage medium) and/or an electronically readable data carrier, on which program segments that may be read and executed by a processing unit are stored in order to carry out all the acts in the method for providing a corrected dataset when the segments are executed by the processing unit.

A mostly software-based implementation has the advantage that even processing units used hitherto may be upgraded in a simple manner with a software update in order to work in the manner according to the present embodiments. Such a computer program product may optionally include, alongside the computer program, additional components, such as, for example, documentation and/or additional components, and also hardware components, such as hardware keys (e.g., dongles, etc.) for using the software.

BRIEF DESCRIPTION OF THE DRAWINGS

In different figures, the same reference signs denote same features.

DETAILED DESCRIPTION

Figure 1:
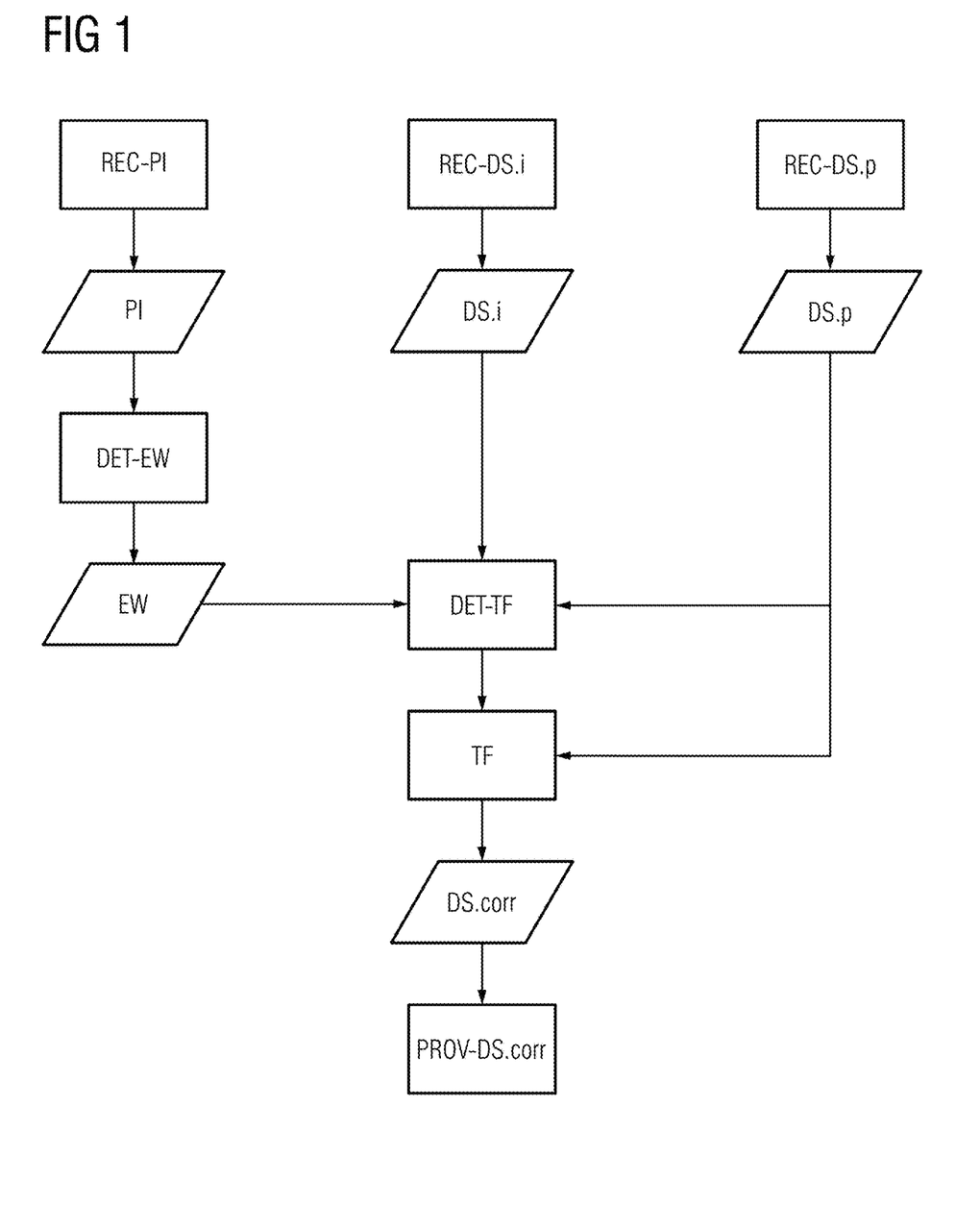
FIGS. 1 and 2 show schematic representations of various embodiments of a method for providing a corrected dataset.

FIG. 1 shows, in schematic form, an embodiment of a method for providing PROV-DS.corr a corrected dataset DS.corr. A preoperative dataset DS.p having an image and/or a model of an examination region of an examination subject may be received REC-DS.p. Further, a first part of a medical object may be arranged intraoperatively in the examination region, and a second part of the medical object may be arranged outside the examination subject. In addition, positioning information PI relating to a spatial positioning of the second part of the medical object may be received REC-PI. Further, an entry angle EW of the medical object into the examination subject may be determined DET-EW using the positioning information PI. Further, an intraoperative dataset DS.i having an image of the examination region may be received REC-DS.i. Here, a conversion instruction TF based on the entry angle EW of the medical object may be determined to minimize a deviation between the preoperative DS.p and the intraoperative dataset DS.i. Hereafter, the corrected dataset DS.corr may be generated by applying the conversion instruction TF to the preoperative dataset DS.p. Further, the corrected dataset DS.corr may be provided PROV-DS.corr.

Figure 2:
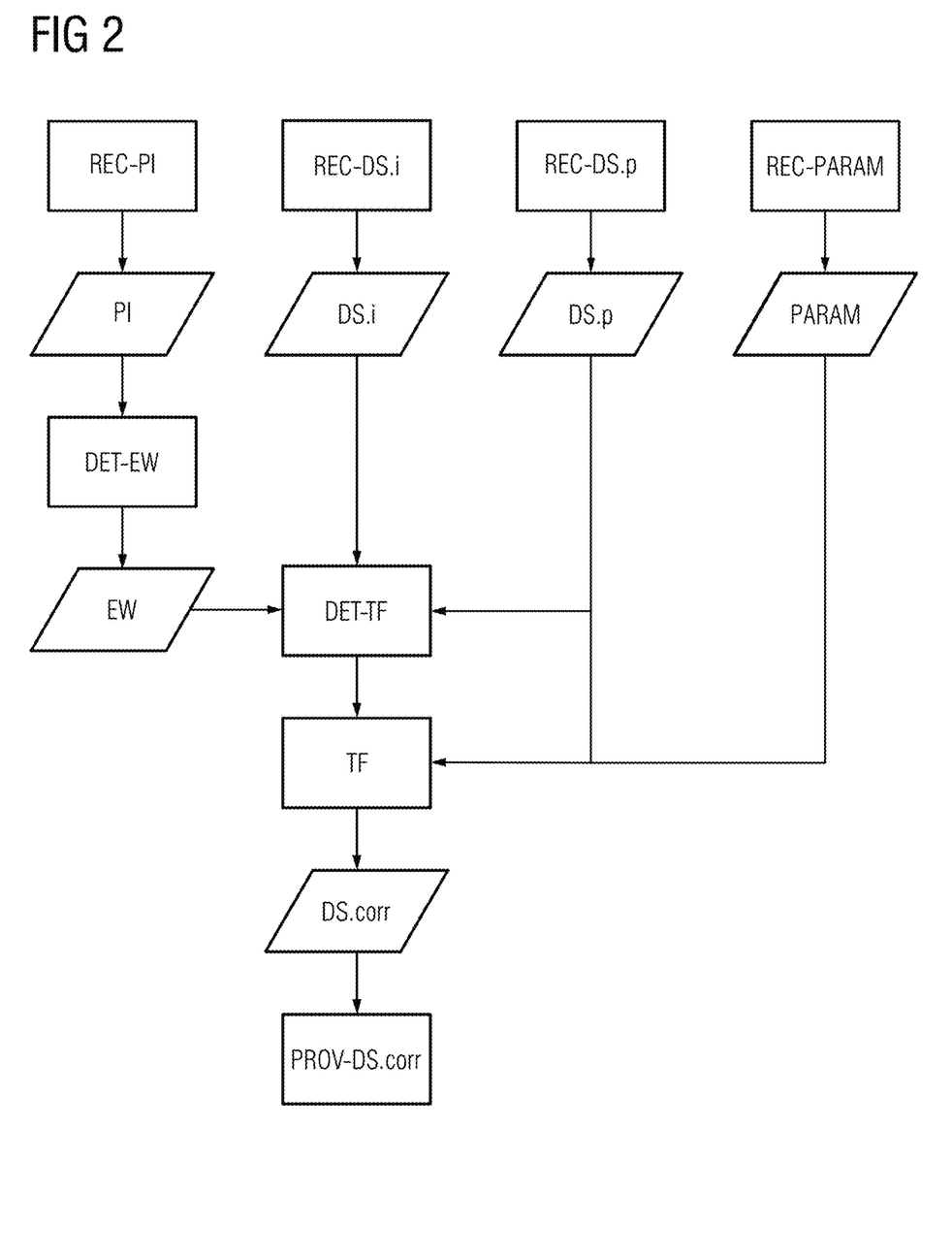

FIG. 2 shows a schematic representation of a further embodiment of the method of one or more of the present embodiments for providing PROV-DS.corr a corrected dataset DS.corr. A material parameter and/or an operating parameter PARAM of the medical object may be received REC-PARAM. Further, the conversion instruction TF may additionally be determined DET-TF based on the material parameter and/or the operating parameter PARAM.

Figure 3:
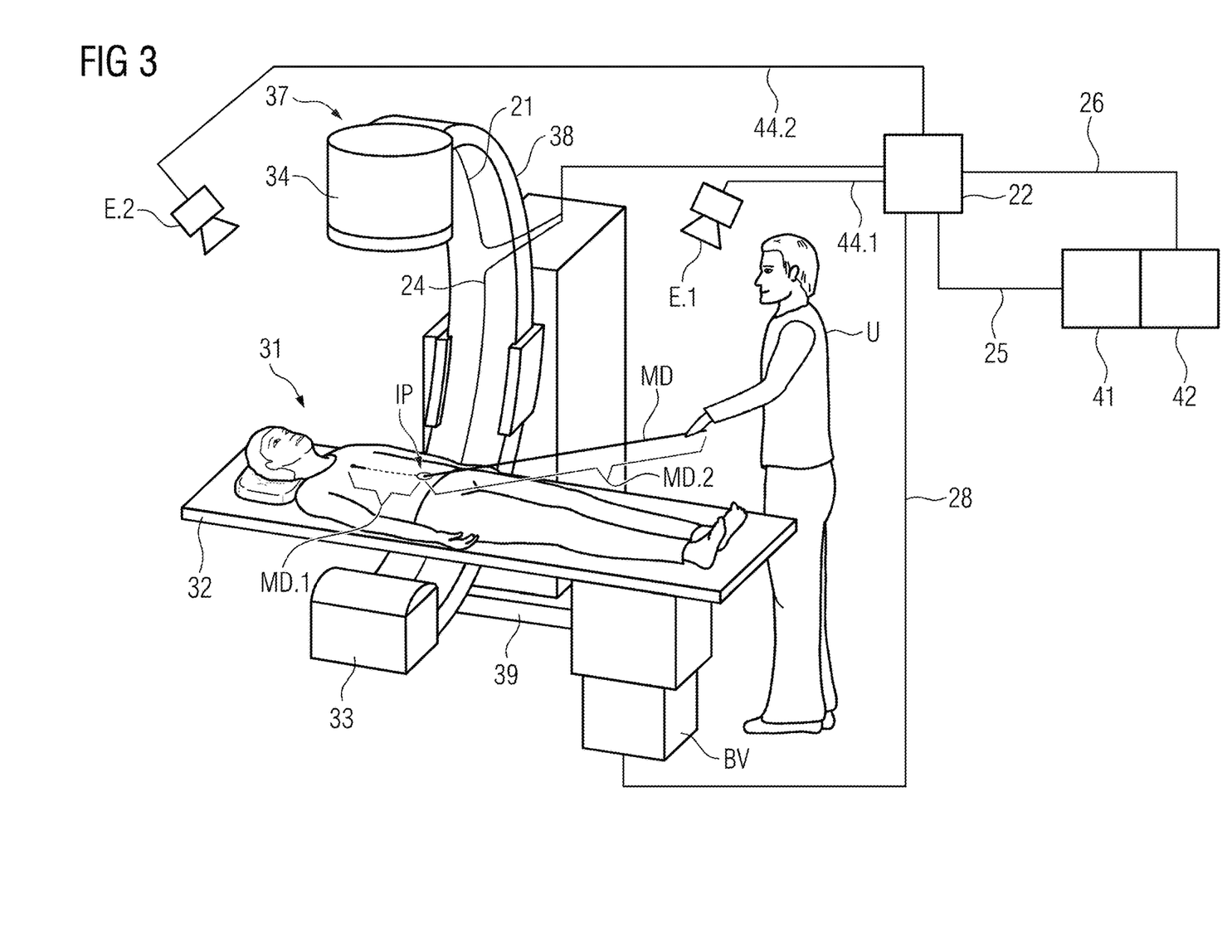
FIG. 3 shows a schematic representation of an embodiment of a system for providing a corrected dataset.

FIG. 3 shows a schematic representation of an embodiment of a system of one or more of the present embodiments for providing PROV-DS.corr a corrected dataset DS.corr. The system may have a medical imaging device (e.g., a medical C-arm X-ray device 37) and a processing unit 22. Further, the system may have an acquisition unit (e.g., a camera unit) including two cameras E.1 and E.2. The processing unit 22 may be embodied to receive REC-DS.p the preoperative dataset DS.p. Further, in the operational state of the system, the first part MD.1 of the medical object MD at the entry point IP may be introduced into the examination subject 31 arranged on the patient-positioning apparatus 32. In the operational state of the system, the second part MD.2 of the medical object may be arranged outside the examination subject 31. In addition, the medical object MD may be controlled and/or moved on the second part MD.2 (e.g., on a proximal section) by a user U (e.g., a medical operator). In one embodiment, the patient-positioning apparatus 32 may be at least partly movable. For this purpose, the patient-positioning apparatus 32 may have a moving unit BV; the moving unit BV is controllable by a signal 28 from the processing unit 22.

The medical imaging device (e.g., the medical C-arm X-ray device 37) may be embodied to record the intraoperative dataset DS.i. In the operational state of the system, the intraoperative dataset DS.i may represent the examination region. The medical C-arm X-ray device 37 may have a detector 34 (e.g., an X-ray detector) and an X-ray source 33. For recording the intraoperative dataset DS.i, the arm 38 of the medical C-arm X-ray device 37 may be movably mounted around one or a plurality of axes. Further, the medical C-arm X-ray device 37 may include a further moving unit 39 (e.g., a wheel system and/or rail system and/or a robotic arm) that facilitates a movement of the medical C-arm X-ray device 37 in the space. The detector 34 and the X-ray source 34 may be movably mounted in a defined arrangement on a joint C-arm 38.

The processing unit 22 may additionally be embodied to control a positioning of the medical C-arm X-ray device 37 relative to the examination subject 31 such that the examination region and the first part MD.1 of the medical object MD, which is at least partly arranged therein, is represented in the intraoperative dataset DS.i recorded by the medical C-arm X-ray device 37. The positioning of the medical C-arm X-ray device 37 relative to the examination subject 31 may include, for example, a positioning of the defined arrangement of the X-ray source 33 and detector 34 (e.g., of the C-arm 38) around one or a plurality of spatial axes.

For recording the intraoperative dataset DS.i relating to the examination subject 31, the processing unit 22 may send a signal 24 to the X-ray source 33. Thereupon, the X-ray source 33 may transmit an X-ray beam (e.g., a cone beam and/or fan beam and/or parallel beam). When the X-ray beam impinges, following an interaction with the examination region of the examination subject 31 that is to be represented, on a surface of the detector 34, the detector 34 may transmit a signal 21 to the processing unit 22. The processing unit 22 may receive the intraoperative dataset DS.i by the signal 21, for example.

The acquisition unit (e.g., the camera unit) may be embodied to provide the positioning information PI relating to a spatial positioning of the second part MD.2 of the medical object MD. The camera unit (e.g., the two cameras E.1 and E.2) may be embodied to record and provide to the processing unit 22 the positioning information having an intraoperative image of the second part MD.2 of the medical object MD (e.g., using in each case a signal 44.1 and 44.2). In one embodiment, the intraoperative image may be registered with the preoperative DS.p and/or the intraoperative dataset DS.i.

Further, the processing unit 22 may be embodied to determine the entry angle EW of the medical object MD into the examination subject 31 using the positioning information PI. In addition, the processing unit 22 may be embodied to determine DET-TF the conversion instruction TF for minimizing the deviation between the preoperative dataset DS.p and the intraoperative dataset DS.i, based on the entry angle EW of the medical object MD. Further, the processing unit 22 may be embodied to provide the corrected dataset DS.corr by applying the conversion instruction TF to the preoperative dataset DS.p.

Further, the camera unit (e.g., the two cameras E.1 and E.2) may be fixed in a defined arrangement on the medical imaging device (e.g., on the medical C-arm X-ray device 37) and/or at least partly incorporated in the medical imaging device (not shown).

The system may further include an input unit 42 (e.g., a keyboard) and/or a display unit 41 (e.g., a monitor and/or display). The input unit 42 can be incorporated in the display unit 41 (e.g., where there is a capacitive and/or resistive input display).

The display unit 41 may be embodied to display information items and/or graphic representations of information items relating to the system and/or to the processing unit 22 and/or to further components (e.g., a graphic representation of the preoperative and/or intraoperative and/or corrected dataset). For example, the display unit 41 may be embodied to display a graphic representation of a superimposition of the preoperative DS.p and of the corrected dataset DS.corr. For this purpose, the processing unit 22 may, for example, transmit a signal 25 to the display unit 41. The input unit 42 may be embodied for acquiring a user input and for providing a signal 26 as a function of the user input.

Figure 4:
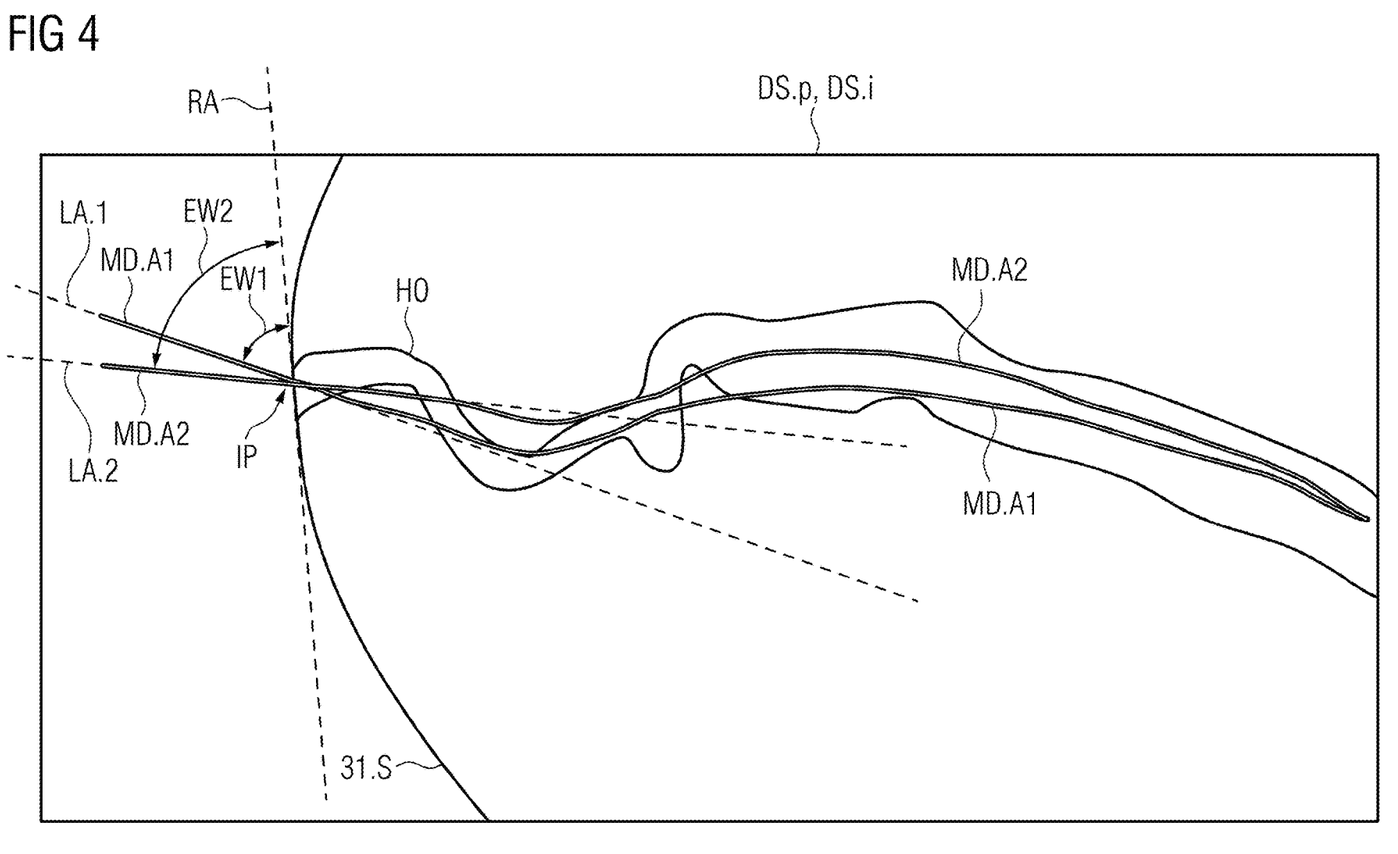
FIG. 4 shows a schematic representation of various medical objects that are arranged.

FIG. 4 shows two different spatial positionings MD.A1 and MD.A2 of the medical object MD in schematic form. In the first spatial positioning MD.A1, the medical object may have a first entry angle EW1, and in the second spatial positioning MD.A2, the medical object may have a second entry angle EW2 at the entry point IP. The first entry angle EW1 may describe, for example, an angle between a first longitudinal extension direction LA.1 of the medical object MD (e.g., of the second part of the medical object MD) in the first spatial positioning MD.A1 and a reference direction RA. The reference direction RA may be in a plane tangential to the surface of the examination subject 31 through the entry point IP. Similarly, the second entry angle EW2 may describe an angle between a second longitudinal extension direction LA.2 of the medical object MD (e.g., of the second part of the medical object MD) in the second spatial positioning MD.A2 and the reference direction RA.

In addition, FIG. 4 shows in schematic form a superimposition of the preoperative dataset DS.p having an image and/or a model of the examination region (e.g., of the hollow organ HO) and of the intraoperative dataset DS.i. In one embodiment, the intraoperative dataset DS.i may have a 2D-image of the examination region. Further, the determination DET-TF of the conversion instruction TF may include a determination of a spatial course of the first part MD.1 of the medical object MD based on the 2D-image of the examination region and the entry angle EW. FIG. 4 illustrates how the spatial course of the first part MD.1 of the medical object MD may be influenced by the entry angle EW1 or EW2. Due to the fact that the conversion instruction TF is determined based on the, for example, current entry angle EW of the medical object MD, an improved deformation correction of the preoperative dataset DS.p may be facilitated.

Figure 5:
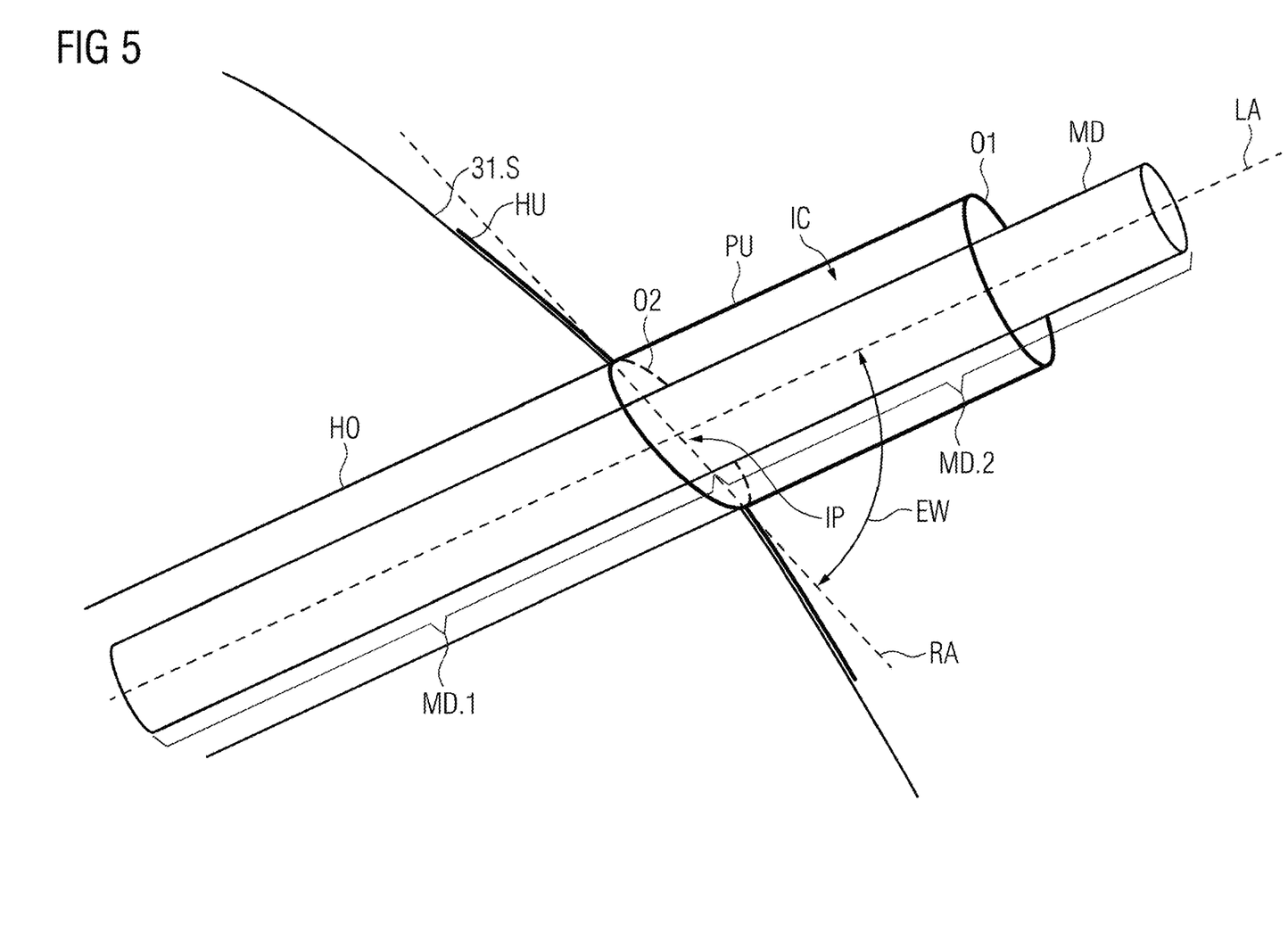
FIG. 5 shows a schematic representation of one embodiment of a positioning unit having an introducer sheath for introducing a medical object into an examination subject.

FIG. 5 shows a schematic representation of a positioning unit having an introducer sheath PU for introducing the medical object MD into the examination subject 31. The introducer sheath PU may have an instrument channel IC and a holding element HU. The holding element HU may be embodied to hold the instrument channel IC at the entry point IP of the medical object MD into the examination subject 31. Further, the instrument channel IC may have a first aperture O1 and a second aperture O2. In one embodiment, the instrument channel IC may be embodied to accommodate at least one part of the medical object MD and to specify the spatial positioning at least of the second part MD.2 of the medical object (e.g., the entry angle EW of the medical object MD). The entry angle EW may describe an angle between the longitudinal extension direction LA of the medical object MD and the reference direction RA. In the operational state of the system, the first aperture O1 may be arranged extracorporeally on the examination subject 31. Further, in the operational state of the system, the second aperture O2 may be arranged on a hollow organ HO of the examination subject 31. The hollow organ HO may have, for example, a vascular segment. In addition, in the operational state of the system, the medical object MD may be introduced into the hollow organ HO, via the first aperture O1 and the second aperture O2 along the instrument channel IC. The medical object MD may continue to be movable along a longitudinal extension direction LA of the medical object MD and/or around the longitudinal extension direction LA. Further, the positioning unit (e.g., the introducer sheath) may be embodied for providing the positioning information PI.

Figure 6:
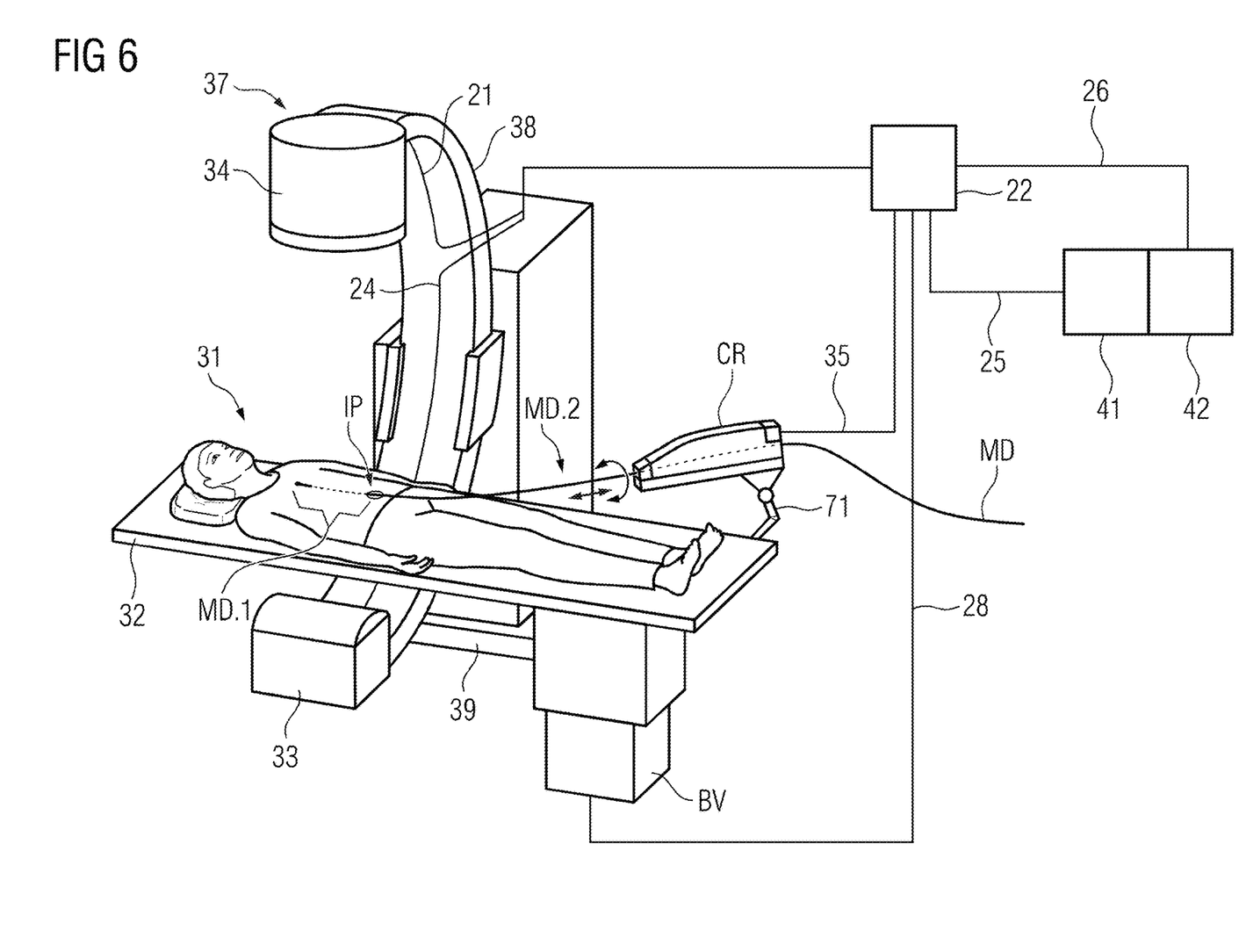
FIG. 6 shows a schematic representation of a further embodiment of a system including a moving apparatus.

FIG. 6 shows a further embodiment of the system in schematic form. The positioning unit may have a moving apparatus CR to robotically move the medical object MD. In one embodiment, in the operational state of the system, the second part MD.2 of the medical object MD may be arranged at least partly in the moving apparatus CR.

The moving apparatus CR may be embodied, for example, as a robotic catheter (e.g., for the remote manipulation of the medical object MD). In the operational state of the system, the first part MD.1 of the medical object MD may be at least partly arranged in the examination region of an examination subject 31 (e.g., in the hollow organ HO). Further, the moving apparatus CR may be fixed by a fixing element 71 (e.g., a stand and/or robotic arm) on the patient-positioning apparatus 32 (e.g., movably). As a result thereof, a spatial positioning of the second part MD.2 of the medical object that is at least partly arranged in the moving apparatus CR may be specifiable in relation to the examination subject 31. In one embodiment, the moving apparatus CR may be embodied to move the medical object MD, which in the operational state of the system is at least partly arranged in the moving apparatus CR, translationally at least along a longitudinal extension direction of the medical object MD. Further, the moving apparatus CR may be embodied to rotate the medical object MD around the longitudinal extension direction.

In one embodiment, the processing unit 22 may be embodied to receive a specification regarding the entry angle EW. Further, the processing unit 22 may be embodied to identify a deviation by making a comparison between the entry angle EW that has been determined and the specification. In addition, the processing unit 22 may be embodied to provide a signal and/or a workflow notification as a function of the deviation.

Figure 7:
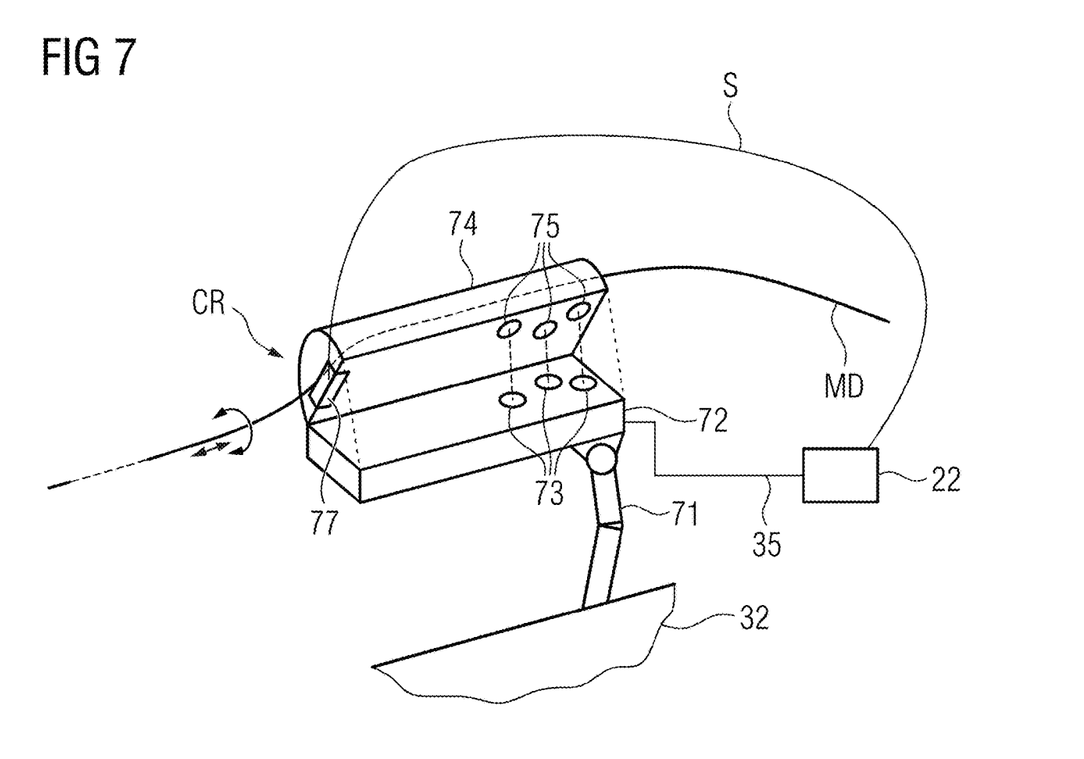
FIG. 7 shows a schematic representation of one embodiment of a moving apparatus.

FIG. 7 shows a schematic representation of the moving apparatus CR for robotically moving the medical object MD. In one embodiment, the moving apparatus CR may have a fixing element 71 (e.g., a movable and/or traversable fixing element). Further, the moving apparatus CR may have a cassette element 74 that is embodied for recording at least one part of the second part MD.2 of the medical object MD. In addition, the moving apparatus CR may have a moving element 72 that is fixed on the fixing element 71 (e.g., on a stand and/or robotic arm). In addition, the fixing element 71 may be embodied for fixing the moving element 72 on the patient-positioning apparatus 32 (e.g., movably). Further, the moving element 72 may have at least one (e.g., three) actuator elements 73 (e.g., an electric motor). The processing unit 22 is embodied to control the at least one actuator element 73. In one embodiment, the cassette element 74 may be connectable (e.g., mechanically and/or electromagnetically and/or pneumatically) to the moving element 72 (e.g., to the at least one actuator element 73). The cassette element 74 may further have at least one transmission element 75 that is movable using the connection between the cassette element 74 and the moving element 72 (e.g., the at least one actuator element 73). For example, the at least one transmission element 75 may be movably connected to the at least one actuator element 73. Further, the transmission element 75 may be embodied to transmit a movement of the actuator element 73 to the medical object MD such that the medical object MD is moved along a longitudinal extension direction of the medical object and/or that the medical object MD is rotated around the longitudinal extension direction. The at least one transmission element 75 may have, for example, a pulley and/or roller and/or faceplate and/or shear plate.

In one embodiment, the moving element 72 may have a plurality of actuator elements 73 (e.g., independently controllable actuator elements). Further, the cassette element 74 may have a plurality of transmission elements 75 (e.g., at least one movement-connected transmission element 75 for each of the actuator elements 73). As a result thereof, a, for example, independent and/or simultaneous movement of the medical object MD along various degrees of freedom of movement may be facilitated.

Further, the moving apparatus CR (e.g., the at least one actuator element 73) may be controllable by the signal 35 from the processing unit 22. As a result thereof, the movement of the medical object MD may be controlled by the processing unit 22 (e.g., indirectly). In addition, an orientation and/or position of the moving apparatus CR relative to the examination subject 31 may be adjustable by moving the fixing element 71.

The moving apparatus may further include a sensor unit 77 (e.g., an electromagnetic and/or optical and/or acoustic and/or mechanical and/or gyroscopic sensor) that is embodied to acquire the spatial positioning (e.g., current spatial positioning) of the second part MD.2 of the medical object MD. Alternatively or additionally, the sensor unit 77 may be embodied to acquire a spatial positioning of the cassette element 74 and/or of the fixing element 71, where the second part MD.2 of the medical object MD that is accommodated in the moving apparatus CR has a defined relative positioning in relation to the cassette element 74 and/or of the fixing element 71. As a result thereof, the spatial positioning of the second part MD.2 of the medical object MD may be acquired.

In one embodiment, the sensor unit 77 may be embodied to provide to the processing unit 22 the positioning information PI having information regarding the spatial positioning of the second part MD.2 of the medical object MD acquired using the signal S.

The schematic views contained in the figures described do not represent any kind of scale or size ratio.

The methods and the apparatuses described in detail in the aforementioned are merely exemplary embodiments that may be varied in many ways by a person skilled in the art without departing from the scope of the invention. Further, the use of the indefinite article "a" or "an" does not preclude the relevant features from being present in plurality. Likewise, the terms "unit" and "element" do not preclude the relevant components from consisting of a plurality of interacting partial components that may optionally also be spatially distributed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing a corrected dataset, the method comprising:
    receiving a preoperative dataset having an image, a model, or the image and the model of an examination region in an examination subject, wherein intraoperatively, a first part of a medical object is arranged in the examination region and a second part of the medical object is arranged outside the examination subject;
    receiving positioning information relating to a spatial positioning of the second part of the medical object, the positioning information including a current spatial position of the second part of the medical object, a current orientation of the second part of the medical object, a current pose of the second part of the medical object, or any combination thereof;
    determining a current entry angle of the medical object into the examination subject using the positioning information;
    receiving an intraoperative dataset having an image of the examination region;
    determining a conversion instruction based on the current entry angle of the medical object, such that a deviation between the preoperative dataset and the intraoperative dataset, caused by deformation of an anatomical structure in the examination region by the first part of the medical object that is arranged in the examination region, is minimized;
    generating the corrected dataset, the generating of the corrected dataset comprising applying the conversion instruction to the preoperative dataset; and
    providing the corrected dataset.

2. The method of claim 1, wherein the intraoperative dataset has a two-dimensional (2D) image of the examination region, and
    wherein determining the conversion instruction comprises determining a spatial course of the first part of the medical object based on the 2D image of the examination region and the current entry angle.

3. The method of claim 1, wherein the positioning information has an intraoperative image of the second part of the medical object, and
    wherein the intraoperative image is registered with the preoperative dataset, the intraoperative dataset, or the preoperative dataset and the intraoperative dataset.

4. The method of claim 3, wherein the intraoperative image is recorded by a camera unit.

5. The method of claim 1, further comprising receiving a material parameter, an operating parameter, or the material parameter and the operating parameter of the medical object, and
    wherein determining the conversion instruction comprises determining the conversion instruction also based on the material parameter, the operating parameter, or the material parameter and the operating parameter.

6. The method of claim 1, wherein the medical object is arranged in a positioning unit,
wherein the positioning unit is configured to accommodate the medical object, such that:
a spatial positioning of at least the second part of the medical object is specifiable; and
the medical object is movable along a longitudinal extension direction of the medical object, around the longitudinal extension direction, or along the longitudinal extension direction and around the longitudinal extension direction, and
wherein the positioning information is provided by the positioning unit.

7. The method of claim 6, wherein the positioning information is provided by the positioning unit, such that the conversion instruction is determined based on the current entry angle of the medical object, without an intraoperative image of the second part of the medical object.

8. The method of claim 1, wherein the positioning information includes the current spatial position of the second part of the medical object, the current spatial position of the second part of the medical object describing a longitudinal extension direction of the second part of the medical object at the current entry point in relation to a surface of the examination subject, a reference direction, or the surface of the examination subject and the reference direction.

9. A system for providing a corrected dataset, the system comprising:
a medical imaging device;
a processing unit; and
an acquisition unit, a positioning unit, or the acquisition unit and the positioning unit,
wherein the processing unit is configured to receive a preoperative dataset having an image, a model, or the image and the model of an examination region in an examination subject,
wherein, in an operational state of the system:
a first part of a medical object is arranged in the examination region; and
a second part of the medical object is arranged outside the examination subject,
wherein the acquisition unit, the positioning unit, or the acquisition unit and the positioning unit are configured to provide positioning information relating to a spatial positioning of the second part of the medical object, the positioning information including a current spatial position of the second part of the medical object, a current orientation of the second part of the medical object, a current pose of the second part of the medical object, or any combination thereof,
wherein the medical imaging device is configured to record an intraoperative dataset, the intraoperative dataset representing the examination region in the operational state of the system, and
wherein the processing unit is further configured to:
determine a current entry angle of the medical object into the examination subject using the positioning information;
determine a conversion instruction based on the current entry angle of the medical object, such that a deviation between the preoperative dataset and the intraoperative dataset, caused by deformation of an anatomical structure in the examination region by the first part of the medical object that is arranged in the examination region, is minimized; and provide the corrected dataset, the provision of the corrected dataset comprising application of the conversion instruction to the preoperative dataset.

10. The system of claim 9, wherein the acquisition unit comprises a camera unit,
wherein the camera unit is configured to record the positioning information having an intraoperative image of the second part of the medical object,
wherein the intraoperative image is registered with the preoperative dataset, the intraoperative dataset, or the preoperative dataset and the intraoperative dataset.

11. The system of claim 10, wherein the camera unit is fixed in a defined arrangement on the medical imaging device, is at least partly incorporated in the medical imaging device, or is fixed in the defined arrangement on the medical imaging device and is at least partly incorporated in the medical imaging device.

12. The system of claim 9, wherein the positioning unit is configured to accommodate the medical object, such that:
a spatial positioning at least of the second part of the medical object is specifiable and
the medical object is movable along a longitudinal extension direction of the medical object, around the longitudinal extension direction, or along the longitudinal extension direction and around the longitudinal extension direction, and
wherein the positioning unit is further configured to provide the positioning information.

13. The system of claim 12, wherein the positioning unit comprises an introducer sheath for introducing the medical object into the examination subject,
wherein the introducer sheath has an instrument channel and a holding element,
wherein the holding element is configured to mount the instrument channel on an entry point of the medical object into the examination subject,
wherein the instrument channel has a first aperture and a second aperture,
wherein the instrument channel is configured to:
accommodate at least one part of the medical object; and
specify the current entry angle of the medical object, and
wherein, in the operational state of the system:
the first aperture is arranged extracorporeally on the examination subject,
the second aperture is arranged on a lumen of a hollow organ of the examination subject, and
the medical object is introduced into the hollow organ via the first aperture and the second aperture along the instrument channel.

14. The system of claim 12, wherein the positioning unit comprises a moving apparatus operable to robotically move the medical object, and
wherein, in the operational state of the system, the second part of the medical object is at least partly arranged in the moving apparatus.

15. The system of claim 9, wherein the processing unit is further configured to:
receive a specification regarding the current entry angle;
identify a deviation, the identification of the deviation comprising a comparison between the current entry angle that has been determined and the specification; and
provide a signal, a workflow notification, or the signal and the workflow notification as a function of the deviation.

16. In a non-transitory computer-readable storage medium that stores instructions executable by a processing unit to provide a corrected dataset, the instructions comprising:
receiving a preoperative dataset having an image, a model, or the image and the model of an examination region in an examination subject, wherein intraoperatively, a first part of a medical object is arranged in the examination region and a second part of the medical object is arranged outside the examination subject;
receiving positioning information relating to a spatial positioning of the second part of the medical object, the positioning information including a current spatial position of the second part of the medical object, a current orientation of the second part of the medical object, a current pose of the second part of the medical object, or any combination thereof;
determining a current entry angle of the medical object into the examination subject using the positioning information;
receiving an intraoperative dataset having an image of the examination region;
determining a conversion instruction based on the current entry angle of the medical object, such that a deviation between the preoperative dataset and the intraoperative dataset, caused by deformation of an anatomical structure in the examination region by the first part of the medical object that is arranged in the examination region, is minimized;
generating the corrected dataset, the generating of the corrected dataset comprising applying the conversion instruction to the preoperative dataset; and
providing the corrected dataset.

17. The non-transitory computer-readable storage medium of claim 16, wherein the intraoperative dataset has a two-dimensional (2D) image of the examination region, and
wherein determining the conversion instruction comprises determining a spatial course of the first part of the medical object based on the 2D image of the examination region and the current entry angle.

18. The non-transitory computer-readable storage medium of claim 16, wherein the positioning information has an intraoperative image of the second part of the medical object, and
wherein the intraoperative image is registered with the preoperative dataset, the intraoperative dataset, or the preoperative dataset and the intraoperative dataset.

19. The non-transitory computer-readable storage medium of claim 18, wherein the intraoperative image is recorded by a camera unit.

20. The non-transitory computer-readable storage medium of claim 16, wherein the instructions further comprise receiving a material parameter, an operating parameter, or the material parameter and the operating parameter of the medical object, and
wherein determining the conversion instruction comprises determining the conversion instruction also based on the material parameter, the operating parameter, or the material parameter and the operating parameter.

21. The non-transitory computer-readable storage medium of claim 16, wherein the medical object is arranged in a positioning unit,
wherein the positioning unit is configured to accommodate the medical object, such that:
a spatial positioning of at least the second part of the medical object is specifiable; and
the medical object is movable along a longitudinal extension direction of the medical object, around the longitudinal extension direction, or along the longitudinal extension direction and around the longitudinal extension direction, and
wherein the positioning information is provided by the positioning unit.

* * * * *